United States Patent [19] [11] 3,999,941
Nachbur et al. BEST AVAILABLE COPY [45] Dec. 28, 1976

[54] PROCESS FOR THE MANUFACTURE OF POLYCONDENSATION PRODUCTS CONTAINING PHOSPHORUS, THE PRODUCTS AND THEIR USE AS FLAMEPROOFING AGENTS

[75] Inventors: Hermann Nachbur, Dornach; Joerg Kern, Oberwil; Arthur Maeder, Therwil, all of Switzerland

[73] Assignee: Ciba-Geigy AG, Basel, Switzerland

[22] Filed: May 13, 1975

[21] Appl. No.: 577,150

Related U.S. Application Data

[60] Division of Ser. No. 399,576, Sept. 21, 1973, Pat. No. 3,907,898, which is a continuation of Ser. No. 164,054, July 19, 1971, abandoned.

[30] Foreign Application Priority Data

July 22, 1970 Switzerland .................. 11101/70
Jan. 20, 1971 Switzerland ...................... 850/71

[52] U.S. Cl. ........................... 8/116 P; 427/381; 427/382; 428/277
[51] Int. Cl.$^2$ ................ D06M 13/28; D06M 15/62
[58] Field of Search ............ 8/116 P; 427/381, 382; 428/277

[56] References Cited

UNITED STATES PATENTS 3,221,057 11/1965 Gordon et al. .................. 260/95 R
3,236,676 2/1966 Coates et al. ..................... 427/382

Primary Examiner—Donald Levy
Assistant Examiner—Maria S. Tungol
Attorney, Agent, or Firm—Joseph G. Kolodny; Edward McC. Roberts; Prabodh I. Almaula

[57] ABSTRACT

The subject of the invention is a process for the manufacture of polycondensation products from hydroxymethylphosphonium compounds, characterized in that at least one anhydrous tetrakis-(hydroxymethyl)-phosphonium salt or tetrakis-(hydroxymethyl)-phosphonium hydroxide is condensed with itself in an anhydrous medium, optionally using an acid catalyst and optionally in the presence of at least one inert organic solvent, at 100° to 150° C, preferably 120° to 150° C, the condensation being continued until 0.5 to 1.5 mols of water have been eliminated per 1 mol of phosphonium compound employed, free hydroxyl groups are, if appropriate, at least partially etherified with at least one alkanol with 1 to 4 carbon atoms, and that the salt of the polycondensation products are, where relevant, converted into the corresponding hydroxides.

The polycondensation products are used for the flameproofing of organic fibre material, especially textiles. Appropriately, the procedure followed is that an aqueous preparation is applied to these materials which contains at least 1) a polycondensation product of the indicated type and 2) a polyfunctional compound, and that the material thus treated are dried and subjected to a heat treatment.

6 Claims, No Drawings

PROCESS FOR THE MANUFACTURE OF POLYCONDENSATION PRODUCTS CONTAINING PHOSPHORUS, THE PRODUCTS AND THEIR USE AS FLAMEPROOFING AGENTS

This is a divisional of application Ser. No. 399,576, filed on Sept. 21, 1973, U.S. Pat. No. 3,907,898, which is a continuation of application Ser. No. 164,054, filed on July 19, 1971, now abandoned.

The subject of the invention is a process for the manufacture of polycondensation products from hydroxymethylphosphonium compounds, characterized in that at least one anhydrous tetrakis-(hydroxymethyl)-phosphonium salt or tetrakis-(hydroxymethyl)-phosphonium hydroxide is condensed with itself in an anhydrous medium, optionally using an acid catalyst and optionally in the presence of at least one inert organic solvent, at 100° to 150° C, preferably 120° to 150° C, the condensation being continued until 0.5 to 1.5 mols of water have been eliminated per 1 mol of phosphonium compound employed, free hydroxyl groups are, if appropriate, at least partially etherified with at least one alkanol with 1 to 4 carbon atoms, and that the salts of the polycondensation products are, where relevant, converted into the corresponding hydroxides.

The condensation is preferably carried out at the reflux temperature of the solvent or solvent mixture employed. Suitable solvents are, above all, aromatic hydrocarbons, such as, for example, toluene, o- m- or p-xylene or a mixture thereof, or xylene-toluene, xylene-benzene or xylene-decahydronaphthalene mixtures. The self-condensation is preferably carried out at 125° to 140° C, or especially at about 135° C.

At the same time it is however also possible to carry out the condensation in the absence of an inert organic solvent, for example if the polycondensation product already prepared serves as the solvent, or if condensation is carried out in the melt.

Appropriately, the procedure followed is that firstly the water of solution is completely removed by distillation from the tetrakis-(hydroxymethyl)-phosphonium compound, which as a rule is in the form of an aqueous solution, and that then the self-condensation is initiated. The process can be carried out continuously or stepwise.

Preferably, the self-condensation is continued until about 0.7 to 1.2 mols, or in particular 0.8 to 1.2 mols, of water of condensation have been eliminated per 1 mol of phosphonium compound employed.

Amongst the tetrakis-(hydroxymethyl)-phosphonium salts used, the halides, such as, for example, the bromide or especially the chloride, are preferred. Tetrakis-(hydroxymethyl)-phosphonium chloride is hereafter referred to as THPC.

Where tetrakis-(hydroxymethyl)-phosphonium hydroxide (THPOH) is used as the starting product, it is appropriately manufactured beforehand from a corresponding salt, for examplr THPC, by neutralisation in aqueous solution with a base, for example sodium hydroxide, and subsequent dehydration.

The polycondensation products thus obtaind are higher-molecular condensates which probably above all contain structural units of the following constitution:

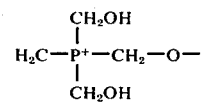

In addition, these polycondensation products probably also contain even more highly crosslinked products, which contain structural units of, for example the following formula

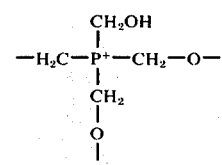

The polycondensation products can furthermore also contain structural units of the following formulae:

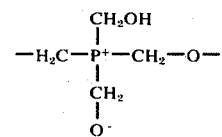

or

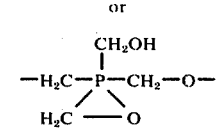

or, under certain circumstances, also minor amounts of

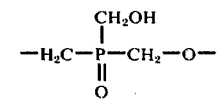

Per molecule, the polycondensation products as a rule contain 2 to 200, preferably 2 to 20, or especially 2 to 10, structural units of the formulae (1) and/or (2).

The etherification, which may have to be carried out, of the polycondensation product still containing free hydroxyl groups, is for example effected with n-butanol, n-propanol, ethanol or especially methanol. Preferably, the process is carried out in an acid medium.

The acid catalysts which are optionally used conjointly in the self-condensation are preferably powerfully acid salts, (LEWIS acids) such as magnesium chloride, ferric chloride, zinc nitrate or boron trifluoride/diethyl ether. The conjoint use of these catalysts is particularly advisable in the case of the self-condensation of THPOH, and where condensation is carried out below 120° C.

After completion of the self-condensation and, where relevant, etherification, the salts of the self-condensation products can also be wholly or partially converted into their corresponding hydroxides, and this is as a rule effected by addition of strong bases, such as alkali hydroxides or alkaline earth hydroxides, for example sodium hydroxide, potassium hydroxide or calcium hydroxide, and also sodium carbonate. The amount of base is appropriately so chosen that the pH-value of the reaction mixture is about 5 to 8.

At times, the end products possess an unpleasant odour, caused by volatile, low-molecular trivalent phosphorus compounds, for example phosphines such as trihydroxymethylphosphine. This odour can be eliminated by an oxidative after-treatment of the polycondensation product, for example by passing air or oxygen into the reaction mixture, or by addition of oxidising agents such as hydrogen peroxide or potassium persulphate.

The polycondensation products are used for the flameproofing of organic fibre material, especially textiles. Appropriately, the procedure followed is that an aqueous preparation is applied to these materials which contains at least 1) a polycondensation product of the indicated type and 2) a polyfunctional compound, and that the materials thus treated are dried and subjected to a heat treatment.

The components 2) are preferably polyfunctional epoxides or above all polyfunctional nitrogen compounds, Possible epoxides are above all epoxides with at least two epoxy groups, which are liquid at room temperature and are preferably derived from polyhydric phenols. Polyfunctional nitrogen compounds are, for example, polyalkylene polyamines or especially aminoplast precursors or aminoplast precondensates. The latter are preferred.

By aminoplast precursors there are understood nitrogen compounds which can be methylolated, and by aminoplast precondensates there are understood additon products of formaldehyde to nitrogen compounds which can be methylolated. The following may be mentioned as aminoplast precursors or as nitrogen compounds which can be methylolated:

1,3,5-Aminortriazines such as N-substituted melamines, for example N-butylmelamine, N-trihalogenomethylmelamines, triazones and ammeline, guanamines, for example benzoguanamines or acetoguanamines, or also diguanamines.

Further possible compounds are: cyanamide, acrylamide, alkylureas or arylureas and alkylthioureas or arylthioureas, alkyleneureas or alkylenediureas, for example urea, thiourea, urones, triazones, ethyleneurea, propyleneurea, acetylenediurea or especially 4,5-dihydroxyimidazolidone-2 and derivatives thereof, for example 4,5-dihydroxyimidazolidone-2 which is substituted in the 4-position at the hydroxyl group by the radical —$CH_2CH_2CO$—NH—$CH_2OH$. The methylol compounds of a urea, of an ethyleneurea or of melamine are preferentially used. Valuable products are furnished in general by products which are methylolated as highly as possible, and especially by low-methylolated products. Suitable aminoplast precondensates are both predominantly monomolecular aminoplasts and also more highly precondensed aminoplasts.

The ethers of these aminoplast precondensates can also be used together with the reaction products. Advantageous examples are the ethers of alkanols such as methanol, ethanol, n-propanol, isopropanol, n-butaol or pentanols. It is however desirable for these aminoplast precondensates to be water-soluble, as is, for example, pentamethylolmelamine-dimethyl-ether.

The organic fibre materials to be provided with a flameproof finish are, for example, wood, paper, furs, hides or preferably textiles. In particular, fibre materials of polyamides, cellulose, cellulose-polyester or polyester are rendered flameproof, fabrics of wool or polyester or mixed fabrics of polyester-cellulose, wherein the ratio of the polyester part to the cellulose part is between 1:4 and 2:1, being preferred. Thus, for example, so-called 20/80, 26/74, 50/50 or 67/33 polyester-cellulose mixed fabrics can be used.

The cellulose or the cellulose component of the fibre material for example originates from linen, cotton, rayon or staple viscose. In addition to polyester-cellulose fibre mixtures, it is also possible to use fibre mixtures of cellulose with natural or synthetic polyamides. Above all, fibre materials of wool can also be efficiently made flameproof with the polycondensation products.

The aqueous preparations for the flameproofing of the organic fibre materials as a rule contain 200 to 600 g/l, preferably 350 to 450 g/l, of the component (1) and 20 to 200 g/l, preferably 40 to 120 g/l, of the components (2). The preparations mostly have an acid to a neutral or weakly alkaline pH-value.

The preparations for flameproofing can optionally contain yet further additives. For example, the addition of 0.1 to 0.5 % of a high molecular polyethylene glycol is advantageous for achieving a higher deposit of substance on fabrics. Furthermore, the customary plasticisers, for example an aqueous polyethylene emulsion, can be added to the preparations.

To improve the mechanical strengths of the fibres, suitable copolymers can also be added to the preparations, for example copolymers of N-methylolacrylamide or cationic copolymers. For example, aqueous emulsions of copolymers of a) 0.25 to 10% of an alkaline earth salt of an $\alpha,\beta$-ethylenically unsaturated monocarboxylic acid, b) 0.25 to 30% of a N-methylolamide or N-methylolamide-ether of an $\alpha,\beta$-ethylenically unsaturated monocarboxylic acid or dicarboxylic acid and c) 99.5 to 60% of at least one other copolymerisable compound are advantageous. These copolymers and their manufacture are known. The tear strength and abrasion resistance of the treated fibre material can be favourably influenced by the conjoint use of such a copolymer.

If a polymer of the indicated type is further added to the preparation, the amounts added are advantageously small, for example 1 to 10%, relative to the amount of the polycondensation product. The same is true of any plasticiser, where the appropriate amounts can again be 1 to 10%.

It is also possible to add curing catalysts such as, for example, ammonium chloride, ammonium dihydrogenation orthophosphate, phosphoric acid, magnesium chloride or zinc nitrate, but this is in most cases not necessary.

An addition of buffer substances, for example $NaHCO_3$, disodium phosphate and trisodium phosphate, or triethanolamine, can also be advantageous.

To improve the durability of the flameproof finishes and to achieve a soft handle, it can be advantageous to add halogenated paraffins, in combination with a polyvinyl halide compound, to the aqueous preparations.

The preparations are now applied to the fibre materials, and this can be effected in a manner which is in itself known. Preferably, piece goods are used and are impregnated on a padder which is fed with the preparation at room temperature.

The fibre material thus impregnated must now be dried, and this is appropriately done at temperatures of up to 100° C. Thereafter, it is subjected to a heat treatment at temperatures above 100° C, for example 100° to 200° C, preferably 120° to 180° C, the duration of this can be the shorter, the higher is the temperature. This period of heating is, for example, 30 seconds to 10 minutes.

It is furthermore also possible to use the so-called moist fixing process or wet fixing process.

A post-wash with an acid-binding agent, preferably with aqueous sodium carbonate solution, can be desirable in the case of a strongly acid reaction medium.

The percentages and parts in the examples which follow are percentages by weight and parts by weight, respectively. The relationship of parts by volume to parts by weight is as of ml to g.

MANUFACTURING EXAMPLES

EXAMPLE 1

1750 parts of a 78% strength aqueous solution of THPC (= 7.15 mol of THPC) and 1000 parts of m-xylene are heated to the boil, with rapid stirring, in a stirring flask of 4000 parts by volume capacity, equipped with a reflux condenser, thermometer and water separator. The azeotropic removal of the water from the aqueous THPC solution starts at a boiling point of 104° C. The calculated amount of water of 385 parts is obtained within 3 hours, and the boiling point reaches 131° C.

A further 145 parts of water are now removed azeotropically by additional treatment for a further 9½ hours at 135° C, this water having been produced by self-condensation of the dehydrated THPC, with simultaneous slight elimination of HCl. This amount of water corresponds to about 1.1 mols of water per mol of THPC. Thereafter the mixture is cooled to 60° C and diluted with 1000 parts of methanol, whereupon the stringy-viscous condensation product dissolves. The m-xylene-methanol mixture is thereafter removed in vacuo at 60° to 70° C.

1127 parts of condensation product are obtained in the form of a colourless, slightly cloudy, highly viscous resin. The product contains 18.6% of phosphorus (THPC = 16.3% P) and is soluble in water in any proportion to give a clear solution. The viscosity at 25° is 2030 poises.

The addition of an aqueous solution of sodium laurylsulphate to the aqueous solution of the condensation product causes precipitation, thereby confirming the higher-molecular cationic character of the condensation product manufactured according to the invention. Water-insoluble condensation products cannot be obtained with ammonia.

EXAMPLE 2

The procedure described in Example 1 is followed, but after completion of the condensation reaction the reaction product is only cooled to 90° C and is dissolved by adding 800 parts of water. Thereafter the whole is cooled to room temperature, the aqueous solution is separated from the xylene phase, and the water is again removed in vacuo. In doing so, it may be of advantage to leave a part of the water in the product (that is to say, for example to manufacture an 80% strength aqueous solution), which permits convenient handling.

1515 parts of a clear, slightly syrupy solution are thus obtained, containing 80% of condensation product. To increase the storage stability, the aqueous solution can be buffered to pH 6 – 7, for example by adding trisodium phosphate or triethanolamine.

EXAMPLE 3

78 parts of anhydrous THPC (previously azeotropically dehydrated in benzene) are suspended in 200 parts of m-xylene in a stirring flask of 500 parts by volume capacity, equipped with a reflux condenser, thermometer and water separator, and are heated to the boiling point of 134° to 135° C. A total of 7.4 parts of water are obtaind by self-condensation over the source of 3 hours, and this amount corresponds to exactly 1 mol of water per mol of THPC. After cooling to 90° C, the resinous condensation product is dissolved by adding 47 parts of water. Thereafter the mixture is cooled to room temperature, the xylene phase is separated off and the aqueous solution is concentrated in vacuo at 50° to 60° C until an 80% strength syrupy, colourless product is obtained. Yield: 87 parts (80% strength).

EXAMPLE 4

190.5 parts (1 mol) of crystalline anhydrous THPC (dehydrated in benzene) are first introduced into a stirring vessel of 500 parts by volume capacity, equipped with a thermometer, water separator and reflux condenser with vacuum connection, and are warmed to 135° C internal temperature, whilst stirring. The product is fused at 80° C.

As soon as the temperature of 135° C is reached, the apparatus is placed under a vacuum of 20 to 30 mm Hg by applying the vacuum connection to the top end of the reflux condenser. After a total of 3 hours' reaction time at 135° C, the condensation is complete and 19 parts (about 1.05 mols) of water have been collected in the water separator. After cooling to room temperature, a very stringy-viscous, colourless, clear resin is obtained, which is soluble in water or methanol.

EXAMPLE 5

200 parts of the condensation product as described in Example 4 are dissolved in 100 parts of methanol in a stirring vessel of 500 parts by volume capacity, equipped with a thermometer and reflux condenser, and etherified for 30 minutes at the reflux temperature (62° C), whilst stirring. The solution has a pH of approx. 1.

Thereafter the mixture is cooled to 40°–45° C and the excess methanol is removed in vacuo. 210 parts of partially etherified polycondensation product are obtained, having a less high viscosity than the starting product and giving a clear solution in dimethylformamide at 25° C.

EXAMPLE 6

244 parts of 78% strength THPC (= 1 mol of pure substance), 3.81 parts of magnesium chloride as catalyst (=2% relative to pure THPC) and 160 parts by volume of toluene are introduced into a stirring vessel of 500 parts by volume capacity equipped with a thermometer, reflux condenser and water separator. The mixture is boiled under reflux, whilst stirring until 1 mol of water (18 parts by volume) has been eliminated; this requires about 10 to 12 hours.

Thereafter, the solvent is removed in a rotary evaporator under reduced pressure. The reaction product is left as cloudy, slightly coloured, viscous syrup, in practically 100% yield.

EXAMPLE 7

190.5 parts of THPOH (1.11 mols), manufactured from THPC by neutralisation with aqueous NaOH and subsequent dehydration, together with 3.81 parts of $MgCl_2$ (2% relative to THPOH) in 160 parts by volume of xylene are heated to the boil whilst stirring, until no further water is eliminated. 13 parts by volume of water (0.72 mol) are separated off in this way.

After evaporation of the solvent, the polycondensation product is left as a viscous syrup in 93% yield.

The polycondensation product is soluble in water.

EXAMPLE 8

238 parts of an 80% strength aqueous THPC solution and 200 parts of m-xylene are dehydrated and condensed, analogously to Example 1, in a stirring vessel of 500 parts by volume capacity equipped with a thermometer and water separator. 73 parts of water are obtained.

The viscous condensation product which has been freed of xylene and methanol is again diluted to 80% solids content with water and is neutrlised to pH 7.5 with 49.5 parts of a 30% strength by weight aqueous sodium hydroxide solution. During the neutralisation, the temperature is kept at 15° to 20° C by cooling. The resulting solution contains 63% of active substance, partly in the form of the hydroxide and partly in the form of the chloride.

EXAMPLE 9

73.5 parts of a 78% strength solution of THPC (= 300 mols) and 42 parts of 1,3-xylene are warmed to the boil, with rapid stirring, in an enamelled stirring kettle of 160 parts by volume capacity, equipped with a water separator and thermometer. The azeotropic removal of the water starts at a boiling point of 103° C. The calculated amount of water of 16.2 parts is obtained within 3½ hours; the boiling point reaches 131° C.

A further 5.1 parts of water, which have been produced, with simultaneous slight elimination of HCl, by self-condensation of the dehydrated THPC, are now removed azeotropically by an additional treatment for a further 7½ hours at 136° to 137° C. This amount of water corresponds to about 0.95 mol of water per mol of THPC. Thereafter the mixture is cooled to 60° C, the stirrer is stopped, and the supernatant xylene is siphoned off as far as possible. The residue is dissolved in 13.5 parts of water and simultaneously cooled to 15° C, whilst stirring. The mixture is adjusted to pH 6 by adding 13.5 parts of 30% strength aqueous sodium hydroxide soluion and is subsequently distilled in vacuo at 50° C until the distillate contains no further xylene. After cooling to 20° C, the product is filtered through a felt, using pressure, in order to isolate the sodium chloride which has separated out.

69 parts of a dark red, clear solution, containing 64.5% of active substance and 5.5% of sodium chloride, are obtained. The pH of the solution is 6.

EXAMPLE 10

170 parts of the condensation product described in Example 1 and 54.2 parts of 2,3-dibromopropanol are dissolved in 55 parts of dimethylformamide, in a stirring vessel of 500 parts by volume capacity, equipped with a reflux condenser and thermometer, and the mixture is stirred for 1 hour at 100° to 105° C. Thereafter the dimethylformamide is distilled off in vacuo at 70° to 80° C.

The residue is dissolved in 400 parts of water and the solution is freed of the water and of unreacted amounts of 2,3-dibromopropanol in vaco at 90° to 95°.

209 parts of a yellow liquid of low viscosity are obtained, this being the partially 2,3-dibromopropanoletherified form of the condensation product from Example 1.

EXAMPLE 11

235 parts (1 mol) of tetrakis-hydroxymethylphosphonium bromide are suspended in 500 ml of xylene. The mixture is heated to the boil until no further water is eliminated; in total, about 12 ml (0.66 mol) of water are eliminated. The xylene is then evaporated under reduced pressure and the product is obtained as a yellow-brown, viscous oil, which is used without further purification.

USE EXAMPLES

Example 12

400 parts of the condensation product described in Example 1 together with 60 parts of trimethylolmelamine are made up into a solution of a total of 1000 parts by volume. The pH is 4 to 5.

A strip of fabric of each of 100% polyester, 50:50 polyester-cotton and 67:33 polyester-cotton is padded in this solution, dried at 80° to 90° C and thermofixed for 4½ minutes at 160° C. The fabrics are subsequently washed for 30 minutes, at 40° C, in a solution which per liter of water contains 5 parts of an all-purpose detergent based on soap.

After this wash, the deposits of fixed flameproofing agent are found to be as follows:

100% polyester fabric = 27.2% relative to original fabric weight.

50:50 polyester-cotton = 27.0% relative to original fabric weight.

67:33 polyester-cotton = 20.6% relative to original fabric weight.

All fabrics possess a very good flameproof character, which remains maintained unchanged even after 5-fold repetition of the wash described above,.

EXAMPLE 13

Example 12 is repeated, but with the condensation product obtained according to Manufacturing Example 3.

After a 5-fold wash (compare Example 12) the deposits of fixed flameproofing agent are found to be as follows:

100% polyester fabric = 32.3% relative to original fabric weight.

50:50 polyester-cotton = 29.4% relative to original fabric weight.

67:33 polyester-cotton = 20.4% relative to original fabric weight.

All fabrics possess a very good flameproof character, which remains maintained unchanged even after a 15-fold wash (compare Example 12).

EXAMPLE 14

400 parts of the condensation product from Example 4 and 60 parts of trimethylolmelamine are dissolved in 500 parts of water and made up to 1000 parts by volume with more water.

A fabric of each of 100% polyester, 50:50 polyester-cotton and 67:33 polyester-cotton is treated analogously to the description in Example 12.

After a 5-fold wash, all fabrics still have a very good flameproof character and possess the following deposits of flameproofing agent and aminoplast resin:

| | |
|---|---|
| 100% polyester fabric: | 26.5% |
| 50:50 polyester fabric: | 24.8% |
| 67:33 polyester fabric: | 18.0% |

Instead of the condensation product of Example 4, the condensation product according to Example 6 or Example 7 can also be employed with equally good success.

EXAMPLE 15

2 different woollen fabrics, weighing 92 g/m² and 165 g/m², are padded in the same application bath as described in Example 14, dried at 90° C and thermofixed (or cured) for 5 minutes at 120° C. Both fabrics are subsequently washed for 20 minutes at 40° C, in a washing liquor of the following composition:

200 parts of sodium tetraborate, 600 parts by volume of an aliphatic polyethylene glycol ether (nonionic), 200 parts by volume of sec. Na alkylsulphate (anionic) and 9200 parts by volume of water (deionised).

After drying, both fabrics have a very good flameproof character and a pleasant handle.

Untreated woollen fabric already combusts completely and very vigorously after brief contact with the flame.

EXAMPLE 16

400 parts of the condensation product described in Example 5 and 60 parts of trimethylolmelamine are made up into a solution of a total of 1000 parts by volume. The pH is 4 to 5.

A strip of fabric of 67:33 polyester-cotton is treated in this solution, in the manner described in Example 12, and is washed. The deposit of fixed flameproofing agent is 19.3%. The fabric has very good flameproof character and only shows moderate stiffening of the handle. The flameproof character remains preserved unchanged even after 5-fold repetition of the wash described in Example 12.

EXAMPLE 17

A strip of wool fabric weighing 165 g/m² is treated with the same liquor as that described in Example 16, in the same manner, and washed. The deposit of fixed flameproofing agent is 32.6%.

The fabric has a very good flameproof character and a pleasant handle. The flameproof effect remains preserved unchanged even after 5-fold repetition of the wash described in Example 12.

EXAMPLE 18

600 parts of the 63% strength product described in Example 8 and 60 parts of trimethylolmelamine are made up into a solution of a total of 1000 parts by volume. The pH is 7.

A strip of fabric of each of 100% polyester and 50:50 polyester-cotton is treated as indicated in Example 12.

The deposits of fixed flameproofing agent approximately correspond to those of Example 12.

The fabrics have a very good flameproof character, which remains preserved even aftr 5-fold repetition of the wash described in Example 12.

EXAMPLE 19

An undyed 50:50 or 67:33 polyester-cotton fabric is padded with a liquor which per liter contains 480 g of the product according to Example 10 and 85 g of dimethylolmelamine (yielding 67 g/l of phosphorus and 35 g/l of nitrogen) and is dried at 80° to 100° C. Thereafter the material is cured for 5 minutes at 150° C.

The fabrics are afterwards washed for 5 minutes at 60° C in a detergent solution which contains 4 g/l of sodium carbonate and 1 g/l of a condensation product of 1 mol of p-tert.-nonylphenol and 9 mols of ethylene oxide.

A further part of this fabric is now washed 20 times or 40 times for 45 minutes in a domestic washing machine, at 40° C, in a solution which per liter of water contains 4 g of a domestic detergent (= SNC-19,8861-wash).

The individual pieces of fabric are then tested for their flameproof character (vertical test DIN 53,906). The results of this test were summarised in the table below.

| | Polyester/Cotton | | |
|---|---|---|---|
| | 50:50 | 67:33 | |
| Degree of Fixing | 61% | 62% | |
| Flameproof Character: | Tear length* in cm | | untreated |
| after post-wash | 10.5 | 8 | burns |
| after 20 SNV 198861 washes | 8.5 | 9 | ↓ |
| after 40 SNV 198861 washes | 9 | 9.5 | |

*The tear length corresponds to the burning penetration length.

EXAMPLE 20

An undyed 50:50 or 67:33 polyester-cotton fabric is padded with a liquor which per litre contains 530 g of the product according to Example 9, 85 g of dimethylolmelamine and 0.25 g of a condensation product of 1 mol of p-tert.-nonylphenol and 9 mols of ethylene oxide. The liquor thus contains 67 g/l of phosphorus and 35 g/l of nitrogen and the pH-value is 5.9. The liquor uptake is 80%. Thereafter the fabric is dried at about 80° C and the material cured for 5 minutes at 150° C.

A part of the fabric is washed for 5 minutes at 60° C in a solution which per liter contains 5 ml of hydrogen peroxide (30% strength), 3 g of sodium hydroxide solution (30% strength), 2 g of waterglass and 0.25 g of a condensation product of 1 mol of p-tert.-nonylphenol and 9 mols of ethylene oxide.

The individual pieces of fabric are then tested for their flameproof character (vertical test DIN 53,900). The test results are summarised in the table which follows.

| | un-treated | Polyester/Cotton | |
|---|---|---|---|
| | | 50:50 | 67:33 |
| Degree of Fixing | — | 67% | 67% |
| Flameproof Character: | | Tear Length in cm | |
| before post-wash | burns | 11.5 | 11.5 |

-continued

| | un-treated burns | Polyester/Cotton | |
|---|---|---|---|
| | | 50:50 | 67:33 |
| after post-wash | burns | 10.5 | 11 |

EXAMPLE 21

An undyed 50:50 or 67:33 polyester-cotton fabric is padded with a liquor which per litre contains 468 g of the product according to Example 11, 85 g of dimethylolmelamine and 0.25 g of a condensation product of 1 mol of p-tert.-nonylphenol and 9 mols of ethylene oxide. The liquor thus contains 67 g/l of phosphorus and 35 g/l of nitrogen and the pH-value (adjusted with sodium hydroxide) is 5.5. The liquor uptake is 80%.

EXAMPLE 22

An undyed 50:50 or 67:33 polyester-cotton fabric is padded with the liquors of the table which follows and dried at 80° to 100° C, and the material is subsequently cured for 4½ minutes at 160° C.

The fabrics are then post-washed for 5 minutes at 60° C in a bath which per liter contains 4 g of sodium carbonate and 1 g of a condensation product of 1 mol of p-tert.-nonylphenol and 9 mols of ethylene oxide.

A part of these fabrics is subjected to 20, and in part also 40, SNV-198861 washes (compare Example 19).

The individual pieces of fabric are then tested for their flameproof character (vertical test DIN 53,906). The results of this test are also summarised in the table which follows.

| Constituents | | un-treated | Treated with Liquor | | | | | | |
|---|---|---|---|---|---|---|---|---|---|
| | | | A | B | C | D | E | F | G |
| Product according to Example 9 | g/l | | 415 | 415 | 415 | 415 | 415 | 415 | 415 |
| Condensation product 1) | g/l | | 0.25 | 0.25 | 0.25 | 0.25 | 0.25 | 0.25 | 0.25 |
| MgCl$_2$ . CH$_2$O | g/l | | 50 | 50 | 50 | 50 | 50 | 50 | 50 |
| Dimethylolmelamine | g/l | | 85 | | | | | 20 | |
| Hexamethylolmelamine-pentamethyl-ether | g/l | | | 220 | | | | | |
| Dimethylol-4-hydroxypropyleneurea | g/l | | | | 440 | | | | |
| Propyleneurea | g/l | | | | | 400 | | | |
| Methylated urone | g/l | | | | | | 400 | | |
| Melamine | g/l | | | | | | | 33 | 53 |
| pH of the liquor, adjusted with NaOH | | | 5.5 | 5.5 | 5.5 | 5.5 | 5.5 | 5.5 | 5.5 |
| Flameproof Character | | | Tear Length in cm | | | | | | |
| 50:50 Polyester/Cotton | | | | | | | | | |
| after post-wash | | burns | 8.5 | 10.5 | 10 | 9.5 | 12 | 8.5 | 9 |
| after 20 SNV-198861 washes | | 8 | 11 | 8.5 | 7.5 | 8 | 9 | 8 | |
| after 40 SNV-198861 washes | | 10.5 | — | — | — | 9 | 10 | 8 | |
| 67:33 Polyester/Cotton | | | | | | | | | |
| after post-wash | | burns | 11 | 12 | — | 9.5 | 9.5 | 9 | 10.5 |
| after 20 SNV-198861 washes | | 9 | 11 | — | 9 | 9 | 9 | 8 | |
| after 40 SNV-198861 washes | | 9.5 | — | — | — | 10 | 10 | 8 | |

1) of 1 mol of p-tert.nonylphenol and 9 mols of ethylene oxide

Thereafter the fabric is dried at about 80° C and the material cured for 5 minutes at 150° C.

The individual pieces of fabric are then tested for their flameproof character (vertical test DIN 53,900). The test results are summarised in the table which follows.

| | un-treated | Polyester/Cotton | |
|---|---|---|---|
| | | 50:50 | 67:33 |
| Deposit on Fabric | — | 35.5% | 35.5% |
| Flameproof Character: | | | |
| Tear length in cm | burns | 12 | 10.5 |

EXAMPLE 23

An undyed 50:50 or 67:33 polyester-cotton fabric is padded with the liquors of the table which follows and dried at 80° to 100° C, the material is subsequently cured for 4½ minutes at 160° C.

The fabrics are then post-washed for 5 minutes at 60° C in a bath which per liter contains 4 g of sodium carbonate and 1 g of a condensation product of 1 mol of p-tert.-nonylphenol and 9 mols of ethylene oxide.

The individual pieces of fabric are then tested for their flameproof character (vertical test DIN 53,906). The results of this test are also summarised in the table which follows.

| Constituents | | un-treated | Treated with Liquor | | | | | | |
|---|---|---|---|---|---|---|---|---|---|
| | | | H | I | J | K | L | M | N |
| Product according to Example 9 | g/l | | 415 | 415 | 415 | 415 | 415 | 415 | 415 |
| Condensation product 1) | g/l | | 0.25 | 0.25 | 0.25 | 0.25 | 0.25 | 0.25 | 0.25 |
| MgCl$_2$. CH$_2$O | g/l | | 50 | 50 | 50 | 50 | 50 | 50 | 50 |
| 5,5-Dimethyl-4-methoxypropyleneurea | g/l | | 535 | | | | | | |
| Dimethylolhydroxypropyleneurea | g/l | | | 440 | | | | | |
| Ethyleneurea | g/l | | | | 365 | | | | |
| Acetylenediurea | g/l | | | | | 330 | | | |
| Hydroxyethylenetriazone | g/l | | | | | | 340 | | |
| Urea | g/l | | | | | | | 150 | |
| Dimethylolmelamine | g/l | | | | | | | | 20 |
| Cyanamide | g/l | | | | | | | | 50 |
| pH of the liquor adjusted with NaOH | g/l | | 5.5 | 5.5 | 5.5 | 5.5 | 5.5 | 5.5 | 5.5 |

-continued

| Flameproof Character | | Tear Length in cm | | | | | |
|---|---|---|---|---|---|---|---|
| 50:50 Polyester/Cotton | burns | 7.5 | — | 7.5 | 11 | 12 | 9 | 10.5 |
| 67:33 Polyester/Cotton | | 11.5 | 9 | 9 | 9.5 | — | 12 | — |

[1] of 1 mol of p-tert.-nonylphenol and 9 mols of ethylene oxide

EXAMPLE 24

An undyed 50:50 or 67:33 polyester-cotton fabric is padded with the liquors of the table which follows, dried at 80° to 100° C and the material is subsequently cured for 4½ minutes at 160° C.

The individual pieces of fabric are then tested for their flameproof character (vertical test DIN 53,906). The results of this test are also summarised in the table which follows.

| Constituents | | un-treated | Treated with Liquor | | | | | |
|---|---|---|---|---|---|---|---|---|
| | | | O | P | Q | R | S | T |
| Product according to Example 9 | g/l | | 415 | 415 | 415 | 415 | 415 | 415 |
| Condensation product [1] | g/l | | 0.25 | 0.25 | 0.25 | 0.25 | 0.25 | 0.25 |
| MgCl₂ . CH₂O | g/l | | 50 | 50 | 50 | 50 | 50 | 50 |
| Dimethylolethylene-carbonate | g/l | | 530 | | | | | |
| Methylolacrylamide | g/l | | | 504 | | | | |
| Dimethylolacrylamide | g/l | | | | 327 | | | |
| Dimethylolmelamine | g/l | | | | | 20 | 20 | 20 |
| Ammeline | g/l | | | | | 42 | | |
| Glyoxalmonourein | g/l | | | | | | 104 | |
| Cyanamide | g/l | | | | | | | 50 |
| pH of the liquor adjusted with NaOH | | | 5.5 | 5.5 | 5.5 | 5.5 | 5.5 | 5.5 |
| Flameproof Character | | | Tear Length in cm | | | | | |
| 50:50 Polyester/Cotton | | 11 | 10.5 | 10.5 | 10.5 | 10 | 10.5 | |
| 67:33 Polyester/Cotton | | — | 9 | 9 | — | — | 10.5 | |

[1] of 1 mol of p-tert.-nonylphenol and 9 mols of ethylene oxide

EXAMPLE 25

A mercerised, bleached cotton fabric is padded with a liquor which contains 195 g/l of the product according to Example 9, 116 g/l of dimethylolmelamine and 2 g of a condensation product of 1 mol of p-tert.-nonylphenol and 9 mols of ethylene oxide (yielding 35 g/l of phosphorus and 48 g/l of nitrogen);

The liquor uptake is 80%. Thereafter the fabric is dried at 80° C and the material cured for 5 minutes at 150° C.

The fabric is then boiled for 5 minutes in a bath which per liter contains 4 g of sodium carbonate and 1 g of a condensation product of 1 mol of p-tert.-nonylphenol and 9 mols of ethylene oxide, and is thereafter rinsed and dried.

A part of this fabric is now further subjected to 65 machine washes according to SNV 198861 at 95° C (compare Example 19).

The individual pieces of fabric are then tested for their flameproof character (vertical test DIN 53,906). The results of this test are summarised in the table which follows.

| Deposit on Fabric after Post-wash | | 13.5% |
|---|---|---|
| Degree of Fixing | | 61% |
| Flameproof Character | treated | untreated |
| after the post-wash: burning time, sec. | 0 | burns |
| Tear length, cm | 8 | |
| after 65 × SNV-198861 washes: | | |
| Burning time, sec. | 0 | burns |
| Tear length, cm | 8 | |

Handle: A trace stiffer than the untreated fabric

EXAMPLE 26

An undyed 50:50 polyester/linen fabric or a 67:33 polyester/regenerated cellulose fabric is padded with a liquor which contains 590 g/l of the product according to Example 9, 85 g/l of dimethylolmelamine and 2 g of a condensation product of 1 mol of p-tert.-nonylphenol and 9 mols of ethylene oxide (yielding 67 g/l of phosphorus and 35 g/l of nitrogen).

The liquor uptake is 80% and 100% respectively. Thereafter the fabric is dried at 80° C and the material cured for 4½ minutes at 160° C.

The fabric is then boiled for 5 minutes in a bath which per litre contains 4 g of sodium carbonate and 0.25 g of a condensation of 1 mol of p-tert.-nonylphenol and 9 mols of ethylene oxide, and is then rinsed and dried.

A part of this fabric is now further subjected to 5 machine washes according to SNV 198861 at 40° C (compare EXAMPLE 19).

The individual pieces of fabric are then tested for their flameproof character (vertical test, DIN 53,906). The results of this test are summarised in the table which follows.

| | 50:50, Polyester/Linen | | 67:33, Polyester/Regenerated Cellulose | |
|---|---|---|---|---|
| | treated | un-treated | treated | un-treated |
| Deposit on fabric after post-wash | 18.2% | — | 22.8% | — |
| Degree of Fixing | 67% | — | 67% | — |
| Flameproof Character after post-wash | | | | |
| burning time, sec. | 0 | burns | 0 | burns |
| Tear length, cm after 5 × SNV 198861 | 10.5 | | 9 | |

-continued

|  | 50:50, Polyester/ Linen Cellulose | | 67:33, Polyester/ Regenerated | |
| --- | --- | --- | --- | --- |
|  | treated | un-treated | treated | un-treated |
| washes: |  |  |  |  |
| Burning time, sec. | 0 | burns | 0 | burns |
| Tear length, cm | 10 |  | 9 |  |

EXAMPLE 27

A wool gabardine fabric is padded with a liquor which contains 590 g/l of the product according to Example 9, 85 g/l of dimethylolmelamine and 1 g of a condensation product of 1 mol of p-tert.-nonylphenol and 9 mols of ethylene oxide (yielding 67 g/l of phosphorus and 35 g/l of nitrogen).

The liquor uptake is 80%. Thereafter the fabric is dried at 80° C and the material cured for 4½ minutes at 160° C.

The fabric is then boiled for 5 minutes in a bath which per liter contains 4 g of sodium carbonate and 0.25 g of a condensation product of 1 mol of p-tert.-nonylphenol and 9 mols of ethylene oxide, and is thereafter rinsed and dried.

A part of this fabric is now further subjected to 5, 10 and 40 machine washes according to SNV 198861 at 40° C (compare Example 19).

The individual pieces of fabric are then tested for their flameproof character (vertical test, DIN 53,906). The results of this test are summarised in the table which follows.

| Deposit on Fabric after post-wash | 14% | |
| --- | --- | --- |
| Degree of Fixing | 67% | |
| Flameproof Character | treated | untreated |
| after post-wash: burning time, sec. | 0 | burns |
| Tear length, cm | 7 |  |
| after 5 × SNV-198861 washes: |  |  |
| Burning time, sec. | 0 |  |
| Tear length, cm | 3 |  |
| after 10 × SNV-198861 washes: |  |  |
| Burning time, sec. | 0 |  |
| Tear length, cm | 3.5 |  |
| after 40× SNV-198861 washes: |  |  |
| Burning time, sec. | 0 |  |
| Tear length, cm | 3 |  |

EXAMPLE 28

A sheepskin and a rabbit fur are each sprayed with the following liquor: 590 g/l of the product according to Example 9, 85 g/l of dimethylolmelamine and 2 g/l of a condensation product of 1 mol of p-tert.-nonylphenol and 9 mols of ethylene oxide.

The liquor thus contains 67 g/l of phosphorus and 35 g/l of nitrogen. After spraying, the material is dried at 80° C. The deposit after drying is in each case about 10%.

In the flameproofing test according to DIN 53,906, using an ignition time of 4 seconds, the test specimens provided with the finish do not burn, whilst the skins and furs without finish immediately burn through.

EXAMPLE 29

Wooden shingles (fir) 2 mm thick are immersed for 5 or 15 minutes into the following liquor: 590 g/l of the product according to Example 9, 85 g/l of dimethylolmelamine and 2 g/l of a condensation product of 1 mol of p-tert.-nonylphenol and 9 mols of ethylene oxide.

The liquor thus contains 67 g/l of phosphorus and 35 g/l of nitrogen. After the liquor has been allowed to drain off, the shingles are dried at 80° C. The deposit is 24 and 30% respectively.

The flameproofing test according to DIN 53,906 gives the following results:

|  | Time of Immersion | | |
| --- | --- | --- | --- |
|  | 5 minutes | 15 minutes | Untreated |
| Burning time, sec. | 10 | 0 | burns |
| Burning length, cm | 6 | 5 |  |

EXAMPLE 30

Ashless filterpaper (70 g/m$^2$) is padded with the following liquor: 590 g/l of the product according to Example 9, 85 g/l of dimethylolmelamine and 2 g/l of a condensation product of 1 mol of p-tert.-nonylphenol and 9 mols of ethylene oxide.

The liquor thus contains 67 g/l of phosphorus and 35 g/l of nitrogen. The liquor uptake is 105%. The paper is dried at 80° C. The deposit is 55%.

The flameproofing test according to DIN 53,906 shows a burning time of 0 seconds and a burning length of 6 cm, whilst untreated filterpaper is completely burnt.

We claim:

1. Process for the flameproofing of organic fibre materials, which comprises applying an aqueous preparation to these materials which contains at least
   1. a polycondensation product of hydroxymethyl phosphonium compounds, wherein said product is made by condensing at least one anhydrous tetrakis-(hydroxymethyl)-phosphonium salt or tetrakis-(hydroxymethyl)-phosphonium hydroxide with itself in an anhydrous medium at 100° to 150° C until 0.5 to 1.5 mols of water have been eliminated per 1 mol of hydroxymethylphosphonium starting material and
   2. an aminoplast precursor or aminoplast precondensate, and that the materials thus treated are dried and subjected to a heat treatment.

2. Process according to claim 1, which comprises using a methylolurea or a methylolmelamine as component 2).

3. Process according to claim 1, which comprises flameproofing fibre material of polyamides, cellulose, cellulosepolyester or polyester.

4. Process according to claim 3, which comprises flameproofing fabrics of wool or polyester or mixed fabrics of polyester-cellulose.

5. Process according to claim 1, which comprises drying the fibre material at temperatures of up to 100° C and subjecting to a heat treatment above 100° C.

6. The organic fibre materials provided with a flameproof finish according to the process of claim 1.

* * * * *